(12) United States Patent
Yamaguchi et al.

(10) Patent No.: US 9,509,216 B2
(45) Date of Patent: Nov. 29, 2016

(54) SWITCHING POWER SUPPLY CIRCUIT

(71) Applicant: Rohm Co., Ltd., Kyoto (JP)

(72) Inventors: Atsushi Yamaguchi, Kyoto (JP); Yohei Moriyama, Kyoto (JP); Koki Sakamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/790,800

(22) Filed: Jul. 2, 2015

(65) Prior Publication Data
US 2016/0006354 A1 Jan. 7, 2016

(30) Foreign Application Priority Data

Jul. 4, 2014 (JP) .................................. 2014-138499
Jul. 2, 2015 (JP) .................................. 2015-133232

(51) Int. Cl.
G05F 1/575 (2006.01)
H02M 3/156 (2006.01)

(52) U.S. Cl.
CPC .................................. H02M 3/1563 (2013.01)

(58) Field of Classification Search
CPC .... H02M 3/155; H02M 3/156; H02M 3/157; H02M 3/1563; H02M 2001/0012; H02M 2003/1566
USPC .................................. 323/280, 282–285, 351
See application file for complete search history.

(56) References Cited

U.S. PATENT DOCUMENTS

| | | | | |
|---|---|---|---|---|
| 8,593,125 B1* | 11/2013 | Xue | ...................... | H02M 3/156 323/280 |
| 2012/0146604 A1* | 6/2012 | Seki | ...................... | H02M 3/158 323/282 |
| 2012/0146609 A1* | 6/2012 | Seki | ...................... | H02M 3/156 323/284 |
| 2014/0132232 A1* | 5/2014 | MacLean | .................. | G05F 1/62 323/271 |
| 2014/0253064 A1* | 9/2014 | Swanson | ............. | H02M 3/1584 323/272 |
| 2014/0253082 A1* | 9/2014 | Swanson | ............... | H02M 3/156 323/284 |
| 2015/0084606 A1* | 3/2015 | Nakamura | ............ | H02M 3/156 323/246 |
| 2015/0263617 A1* | 9/2015 | Xue | ...................... | H02M 3/156 323/271 |
| 2016/0087595 A1* | 3/2016 | Gopalraju | ........... | H03F 3/45475 323/271 |

FOREIGN PATENT DOCUMENTS

| | | |
|---|---|---|
| JP | 2004-208440 | 7/2004 |
| JP | 2010-252627 | 11/2010 |

* cited by examiner

*Primary Examiner* — Adolf Berhane
(74) *Attorney, Agent, or Firm* — Fish & Richardson P.C.

(57) ABSTRACT

A switching power supply circuit includes: a voltage generation circuit that generates an output voltage by smoothing, with a capacitor, a voltage produced in an inductor; an integration circuit that integrates a switching voltage to generate a first ripple voltage including a first ripple component; a feedback voltage generation circuit that divides the output voltage to generate a feedback voltage; a comparison circuit that compares the feedback voltage with a reference voltage to output the result of the comparison as a comparison result signal; an integration circuit that integrates the comparison result signal to generate a second ripple voltage including a second ripple component; and a drive circuit that controls the turning on and off of a switch element based on the comparison result signal, where the first ripple component and the second ripple component are added to the feedback voltage.

11 Claims, 8 Drawing Sheets

SWITCHING POWER SUPPLY CIRCUIT

CROSS-REFERENCE TO RELATED APPLICATIONS

This application is based on Japanese Patent Application No. 2014-138499 filed in Japan on Jul. 4, 2014 and Japanese Patent Application No. 2015-133232 filed in Japan on Jul. 2, 2015, the contents of which are hereby incorporated by reference.

BACKGROUND OF THE INVENTION

1. Field of the Invention

The present invention relates to a switching power supply circuit that more stably supplies an output voltage which is generated by stepping down or stepping up an input voltage supplied from a power supply.

2. Description of the Related Art

In general, switching power supply circuits are known that generate an output voltage by stepping down or stepping up an input voltage supplied from a power supply. Among them, as a switching power supply circuit which can perform a high-speed operation and whose size is easily reduced, a non-insulated switching power supply circuit using an inductor is widely utilized. As switching power supply circuits, various types of systems are adopted, and among them, as a system which can perform a high-speed operation and which can realize a low cost, for example, attention is focused on switching power supply circuits of a ripple control system such as ones disclosed in Japanese Unexamined Patent Application Publication No. 2010-252627 and Japanese Unexamined Patent Application Publication No. 2004-208440.

FIG. 4 is a diagram schematically showing a conventional switching power supply circuit 30 of the ripple control system. The switching power supply circuit 30 includes a voltage generation circuit 21, an integration circuit 22, a feedback voltage generation circuit 23, a comparison circuit 24 and a drive circuit 26. A power supply 27 and a load 28 are connected to the switching power supply circuit 30.

The voltage generation circuit 21 includes an input terminal T21, a switch element SW21, an inductor L21, a capacitor C21, an output terminal T22 and a diode D21. The voltage generation circuit 21 has a function as a step-down converter that smoothes, with the capacitor C21, a voltage generated from an input voltage Vin21 supplied from the power supply 27 based on the turning on and off of the switch element SW21 in the inductor L21 and that outputs it from the output terminal T21 as an output voltage Vout21. Here, the node of a connection point between the inductor L21 and the source terminal S of the switch element SW21 is referred to as a node N21, and the voltage of the node N21 changed by the turning on and off of the switch element SW21 is referred to as a switching voltage Vn21. The anode of the diode D21 is grounded, and the cathode is connected to the node N21.

The integration circuit 22 includes a resistor element R21 and a capacitor C22, and integrates the switching voltage Vn21 supplied from the node N21 with the resistor element R21 and the capacitor C22 to generate a ripple voltage VS21. Here, the node of a connection point between the resistor element R21 and the capacitor C22 is referred to as a node N22. Since the ripple voltage VS21 is generated by integrating the switching voltage Vn21 changing from, for example, 0 to 12 V through the turning on and off of the switch element SW21, the ripple voltage VS21 includes a ripple component corresponding to this change.

The feedback voltage generation circuit 23 includes a resistor element R22 and a resistor element R23, and divides the output voltage Vout21 to generate a feedback voltage VK21. Here, the node of a connection point between the resistor element R22 and the resistor element R23 is referred to as a node N23. The node N23 and the node N22 are connected. Hence, the feedback voltage VK21 of the node N23 is an addition value of a voltage obtained by dividing the output voltage Vout21 with the resistor element R22 and the resistor element R23 and the ripple voltage VS21, and includes a ripple component of the ripple voltage VS21.

The comparison circuit 24 includes a comparator 24a and a reference power supply 24b. The comparator 24a includes an inverting terminal 24d and a non-inverting terminal 24e. The inverting terminal 24d is connected to the node N23 to receive the supply of the feedback voltage VK21 from the feedback voltage generation circuit 23. The non-inverting terminal 24e receives the supply of a reference voltage Vref21 from the reference power supply 24b. The comparator 24a compares the feedback voltage VK21 input to the inverting terminal 24d and the reference voltage Vref21 input to the non-inverting terminal 24e, and when the feedback voltage VK21 becomes higher than the reference voltage Vref21, the comparator 24a outputs, as the comparison result, for example, a low-level comparison result signal VH21 of 0 V with a delay corresponding to the operation time of itself whereas when the feedback voltage VK21 becomes lower than the reference voltage Vref21, the comparator 24a outputs, as the comparison result, for example, a high-level comparison result signal VH21 of 5 V with a delay corresponding to the operation time of itself.

The drive circuit 26 receives the supply of the comparison result signal VH21 from the comparison circuit 24, and supplies, to the gate terminal G of the switch element SW21, a control signal VD21 having a voltage level different depending on the voltage level of the comparison result signal VH21. When the comparison result signal VH21 is high, the drive circuit 26 supplies, for example, a high-level control signal VD21 of 17 V to the gate terminal G of the switch element SW21 whereas when the comparison result signal VH21 is low, the drive circuit 26 supplies, for example, a low-level control signal VD21 of 0 V to the gate terminal G of the switch element SW21, with the result that the drive circuit 26 controls the turning on and off of the switch element SW21. In this way, the switching voltage Vn21 changes between, for example, 0 to 12V.

FIG. 5 is a diagram showing the signal waveforms of the individual portions of the switching power supply circuit 30 shown in FIG. 4 as time changes. The upper stage of FIG. 5 is a diagram showing a relationship between the signal waveform of the feedback voltage VK21 and the reference voltage Vref21. The middle stage of FIG. 5 is a diagram showing the signal waveform of the comparison result signal VH21. The lower stage of FIG. 5 is a diagram showing the change of the voltage Vin21. In each of the stages of FIG. 5, the vertical axis represents the voltage level V, the horizontal axis represents the time t and times t10 to t17 represent common times to the stages of FIG. 5.

At the time t10, since, for example, the feedback voltage VK21 of 3 V input to the inverting terminal 24d is higher than, for example, the reference voltage Vref21 of 2 V, the comparison circuit 24 outputs a low-level comparison result signal VH21. Since the comparison result signal VH21 is low, the switch element SW21 controlled by the drive circuit 26 is off, and the switching voltage Vn21 has a voltage level which is lowered by a voltage corresponding to a voltage drop of the diode D21 with respect to the ground voltage. Here, in the lower stage of FIG. 5, for convenience of the drawing of the diagram, when the switching voltage Vn21 is lower than 0 V, 0 V is shown.

When at the time t11, the feedback voltage VK21 input to the inverting terminal 24d becomes equal to or less than the reference voltage Vref21, at the time t12 which is delayed by the operation time of the comparison circuit 24, the high-level comparison result signal VH21 is output from the comparison circuit 24 and is supplied to the drive circuit 26. Here, since the drive circuit 26 is lower in operation speed than the comparison circuit 24, the timing at which the switch element SW21 is tuned on is delayed to the time t13. Hence, in a period A21 from the time t12 to the time t13, that is, during a time in which after the comparison result signal VH21 is turned high, the switch element SW21 is turned on, the feedback voltage VK21 based on the switching voltage Vn21 is continuously lowered to, for example, 1 V.

When at the time t13, with a delay corresponding to the operation time of the drive circuit 26, the high-level control signal VD21 is supplied from the drive circuit 26 to the gate terminal G of the switch element SW21, the switch element SW21 is turned on. In this way, the input voltage Vin is supplied from the power supply 27 through the switch element SW21 to the node N21, the switching voltage Vn21 is increased and the output voltage Vout21 is increased accordingly. As the output voltage Vout21 is increased, the feedback voltage VK21 is increased. Here, the switching voltage Vn21 is increased to, for example, 12 V. Here, a time necessary for the potential of the feedback voltage VK21 to exceed the reference voltage Vref21 again is the time corresponding to the continuous decrease during the period A21.

When at the time t14, the feedback voltage VK21 input to the inverting terminal 24d exceeds the reference voltage Vref21, at the time t15 which is delayed by the operation time of the comparison circuit 24, the low-level comparison result signal VH21 is output from the comparison circuit 24 and is supplied to the drive circuit 26. Here, since the drive circuit 26 is lower in operation speed than the comparison circuit 24, the timing at which the switch element SW21 is tuned off is delayed to the time t16. Hence, in a period B21 from the time t15 to the time t16, that is, during a time in which after the comparison result signal VH is turned low, the switch element SW21 is turned off, the potential of the feedback voltage VK21 based on the potential of the node N21 is continuously increased to, for example, 3 V. Here, since the feedback voltage VK21 includes a ripple component of the ripple voltage VS21, the feedback voltage VK21 is significantly increased.

At the time t16, with a delay corresponding to the operation time of the drive circuit 26, the low-level control signal VD21 is supplied from the drive circuit 26 to the gate terminal G of the switch element SW21, and the switch element SW21 is turned off. In this way, the supply of the input voltage Vin21 from the power supply 27 to the node N21 is stopped, the switching voltage Vn21 is lowered and the output voltage Vout21 is lowered accordingly. As the output voltage Vout21 is lowered, the feedback voltage VK21 is lowered. Here, a time necessary for the potential of the feedback voltage VK21 to become equal to or less than the reference voltage Vref21 again is the time corresponding to the continuous increase during the period B21.

As described above, disadvantageously, in the switching power supply circuit 30, even after the signal level of the comparison result signal VH21 is switched, the feedback voltage VK21 is continuously increased or lowered over a given period of time, and thus it takes much time for the feedback voltage VK21 to reach the reference voltage Vref21 again, with the result that it is impossible to stably supply the output voltage Vout21 to the load 28. In particular, since the feedback voltage VK21 includes the ripple component of the ripple voltage VS21 which is affected by the change of the switching voltage Vn21, the feedback voltage VK21 is more significantly increased, with the result that the above problem caused when the feedback voltage VK21 is increased is more remarkable.

FIG. 6 is a diagram schematically showing a conventional switching power supply circuit 40 different from the conventional switching power supply circuit 30 shown in FIG. 4. The switching power supply circuit 40 includes a voltage generation circuit 31, a feedback voltage generation circuit 33, a comparison circuit 34, an integration circuit 35 and a drive circuit 36. A power supply 37 and a load 38 are connected to the switching power supply circuit 40. The switching power supply circuit 40 differs from the switching power supply circuit 30 shown in FIG. 4 in that a configuration corresponding to the integration circuit 22 is not included and that the integration circuit 35 is included as a circuit for adding the ripple component to the feedback voltage generation circuit 33.

The voltage generation circuit 31 includes an input terminal T31, a switch element SW31, an inductor L31, a capacitor C31, an output terminal T32 and a diode D31. The voltage generation circuit 31 has a function as a step-down converter that smoothes, with the capacitor C31, a voltage generated from an input voltage Vin31 supplied from the power supply 37 based on the turning on and off of the switch element SW31 in the inductor L31 and that outputs it as an output voltage Vout31 from the output terminal T32. Here, the node of a connection point between the inductor L31 and the source terminal S of the switch element SW31 is referred to as a node N31, and the voltage of the node N31 changed by the turning on and off of the switch element SW31 is referred to as a switching voltage Vn31. The anode of the diode D31 is grounded, and the cathode is connected to the node N31.

The feedback voltage generation circuit 33 includes a resistor element R32 and a resistor element R33, and divides the output voltage Vout31 to generate a feedback voltage VK31. Here, the node of a connection point between the resistor element R32 and the resistor element R33 is referred to as a node N33.

The comparison circuit 34 includes a comparator 34a and a reference power supply 34b. The comparator 34a includes an inverting terminal 34d and a non-inverting terminal 34e. The inverting terminal 34d is connected to the node N33 to receive the supply of the feedback voltage VK31 from the feedback voltage generation circuit 33. The non-inverting terminal 34e receives the supply of a reference voltage Vref31 from the reference power supply 34b. The comparator 34a compares the feedback voltage VK31 input to the inverting terminal 34d and the reference voltage Vref31 input to the non-inverting terminal 34e, and when the feedback voltage VK31 becomes higher than the reference voltage Vref31, the comparator 34a outputs, as the comparison result, for example, a low-level comparison result signal VH31 of 0 V with a delay corresponding to the operation time of itself whereas when the feedback voltage VK31 becomes lower than the reference voltage Vref31, the comparator 34a outputs, as the comparison result, for example, a high-level comparison result signal VH31 of 5 V with a delay corresponding to the operation time of itself.

The integration circuit 35 includes a resistor element R36 and a capacitor C32, and integrates, with the resistor element R36 and the capacitor C32, the comparison result signal VH31 supplied from the output terminal of the comparator 34a to generate a ripple voltage VS31. Here, the node of a connection point between the resistor element R36 and the capacitor C32 is referred to as a node N34. The node N33 and the node N34 are connected. Hence, the feedback voltage VK31 of the node N33 is an addition value of a voltage obtained by dividing the output voltage Vout31 with the resistor element R32 and the resistor element R33 and the ripple voltage VS31. Since the ripple voltage VS31 is generated by integrating the comparison result signal VH31 changing from, for example, 0 to 5 V, the ripple voltage VS31 includes a ripple component corresponding to this change. Here, the amplitude of a signal serving as the ripple component included in the ripple voltage VS31 is, as described in FIG. 4, lower than that of a signal serving as the ripple component included in the ripple voltage VS21 obtained from the switching voltage Vn21 changing from 0 to 12 V.

The drive circuit 26 receives the supply of the comparison result signal VH31 from the comparison circuit 34, and supplies, to the gate terminal G of the switch element SW31, a control signal VD31 having a voltage level different depending on the voltage level of the comparison result signal VH31. When the comparison result signal VH31 is high, the drive circuit 36 supplies, for example, a high-level control signal VD31 of 17 V to the gate terminal G of the switch element SW31 whereas when the comparison result signal VH31 is low, the drive circuit 36 supplies, for example, a low-level control signal VD31 of 0 V to the gate terminal G of the switch element SW21, with the result that the drive circuit 36 controls the turning on and off of the switch element SW31. In this way, the switching voltage Vn31 changes between, for example, 0 to 12V.

FIG. 7 is a diagram showing the signal waveforms of the individual portions of the switching power supply circuit 40 shown in FIG. 6 as time changes. The upper stage of FIG. 7 is a diagram showing a relationship between the signal waveform of the feedback voltage VK31 and the reference voltage Vref31. The middle stage of FIG. 7 is a diagram showing the signal waveform of the comparison result signal VH31. The lower stage of FIG. 7 is a diagram showing the change of the voltage Vin31. In each of the stages of FIG. 7, the vertical axis represents the voltage level V, the horizontal axis represents the time t and times t20 to t28 represent common times to the stages of FIG. 7.

At the time t20, since, for example, the feedback voltage VK31 of 2.1 V input to the inverting terminal 34d is higher than, for example, the reference voltage Vref31 of 2 V, the comparison circuit 34 outputs a low-level comparison result signal VH31. Since the comparison result signal VH31 is low, the switch element SW31 controlled by the drive circuit 36 is off, and the switching voltage Vn31 has a voltage level which is lowered by a voltage corresponding to a voltage drop of the diode D31 with respect to the ground voltage. Here, in the lower stage of FIG. 7, for convenience of the drawing of the diagram, when the switching voltage Vn31 is lower than 0 V, 0 V is shown.

When at the time t21, the feedback voltage VK31 input to the inverting terminal 34d becomes equal to or less than the reference voltage Vref31, at the time t22 which is delayed by the operation time of the comparison circuit 34, the high-level comparison result signal VH31 is output from the comparison circuit 34 and is supplied to the drive circuit 36. Here, since the drive circuit 36 is lower in operation speed than the comparison circuit 34, the timing at which the switch element SW31 is tuned on is delayed.

Here, when at the time t23, exogenous noise enters the inverting terminal 34d, the feedback voltage VK31 input to the inverting terminal 34d is temporarily increased after the time t23, exceeds the reference voltage Vref31 at the time t24 and is increased to, for example, 2.3 V. Hence, at the time t25 which is delayed by the operation speed of the comparison circuit 34, the comparison result signal VH31 is turned low. Thereafter, when the temporarily increased voltage level of the feedback voltage VK31 is lowered to become equal to or less than the reference potential Vref31 at the time t26, at the time t27, the high-level comparison result signal VH31 is again output from the comparison circuit 34 to the drive circuit 36, and at the time t28, the drive circuit 36 supplies the high-level control signal VD31 to the gate terminal G of the switch element SW31. In this way, the potential of the node N31 is increased, and thus the potential of the feedback voltage VK31 is increased.

As described above, since in the switching power supply circuit 40, the ripple component included in the feedback voltage VK31 is lower than the feedback voltage VK21 of the switching power supply circuit 30, when exogenous noise enters to temporarily increase the feedback voltage VK31, the feedback voltage VK31 is highly likely to exceed the reference voltage Vref31 as compared with the switching power supply circuit 30. When the feedback voltage VK31 is temporarily increased to exceed the reference voltage Vref31, the comparison result signal VH31 supplied from the comparison circuit 34 to the drive circuit 36 is temporarily turned low, the operation of the drive circuit 36 is temporarily stopped and thus the increase of the potential of the node N31 is delayed, with the result that it takes much time to return to a desired potential. Hence, disadvantageously, the output voltage Vout31 generated by the switching power supply circuit 40 becomes unstable.

SUMMARY OF THE INVENTION

In view of the foregoing, the present invention provides a switching power supply circuit that can more stably supply an output voltage generated by stepping down or stepping up a power supply voltage.

A switching power supply circuit of the present invention includes: a voltage generation circuit that generates an output voltage from an input voltage supplied from a power supply by smoothing, with a capacitor, a voltage produced in an inductor based on the turning on and off of a switch element; a first integration circuit that integrates a switching voltage produced by the turning on and off of the switch element to generate a first ripple voltage including a first ripple component; a feedback voltage generation circuit that divides the output voltage to generate a feedback voltage; a comparison circuit that compares the feedback voltage input to a first input terminal with a reference voltage input to a second input terminal to output the result of the comparison as a comparison result signal; a second integration circuit that integrates the comparison result signal to generate a second ripple voltage including a second ripple component; and a drive circuit that controls the turning on and off of the switch element based on the comparison result signal, where the first ripple component and the second ripple component are added to the feedback voltage input to the first input terminal.

The other features, factors, steps, advantages and characteristics in the present invention will be further apparent from the following detailed description of the preferred embodiment and the accompanying drawings thereon.

DETAILED DESCRIPTION OF THE PREFERRED EMBODIMENTS

An embodiment of the present invention will be described below with reference to drawings. Values, circuits and the like which will be described below can be selected as necessary without departing from the spirit of the present invention.

[Embodiment]

Figure 1:
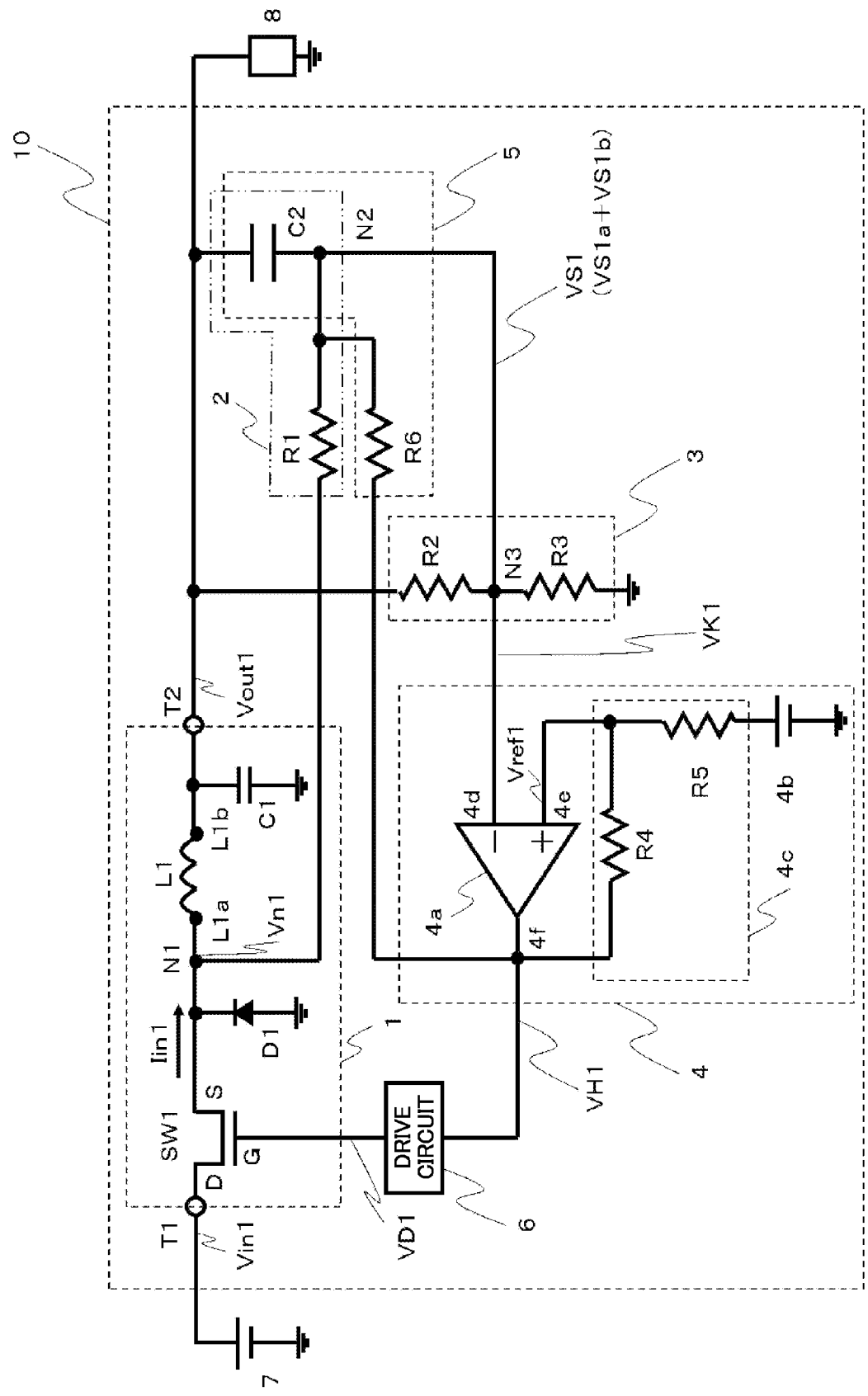
FIG. 1 A diagram schematically showing a switching power supply circuit 10 according to an embodiment of the present invention.

FIG. 1 is a diagram schematically showing a switching power supply circuit 10 according to an embodiment of the present invention. The switching power supply circuit 10 is a step-down DC-DC converter of an asynchronous system. The switching power supply circuit 10 includes a voltage generation circuit 1, an integration circuit 2 serving as a first integration circuit, a feedback voltage generation circuit 3, a comparison circuit 4, an integration circuit 5 serving as a second integration circuit and a drive circuit 6. A power supply 7 and a load 8 are connected to the switching power supply circuit 10.

The voltage generation circuit 1 includes an input terminal T1, a switch element SW1, an inductor L1, a capacitor C1, an output terminal T2 and a diode D1 serving as a rectification element.

For example, an input voltage Vin1 of 12 V is supplied from the power supply 7 to the input terminal T1. In the switch element SW1, a drain terminal D which is one end is connected to the input terminal T1. The inductor L1 includes a terminal L1a serving as a first terminal and a terminal L1b serving as a second terminal, and the terminal L1a is connected to a source terminal S which is the other end of the switch element SW1 and is connected in series to the switch element SW1. Here, the switch element SW1 controls the inflow of a current from the input terminal T1 to the inductor L1. The node of a connection point between the terminal L1a of the inductor L1 and the source terminal S of the switch element SW1 is referred to as a node N1 serving as a first node, and the voltage of the node N1 which is changed by the turning on and off of the switch element SW1 is referred to as a switching voltage Vn1.

In the capacitor C1, one end is connected to the terminal L1b of the inductor L1, the other end is grounded and a voltage generated in the inductor L1 is smoothed based on the turning on and off of the switch element SW1. The output terminal T2 is connected to a connection point between the terminal L1b of the inductor L1 and one end of the capacitor C1, and outputs the voltage smoothed by the capacitor C1 as an output voltage Vout1.

The voltage generation circuit 1 has the configuration described above and has a function as a step-down DC-DC converter that steps down the input voltage Vin1 of 12 V input from the input terminal T1 to generate, for example, the output voltage Vout1 of 5 V and that outputs it from the output terminal T2. Here, the step-down operation by the voltage generation circuit 1 is performed by converting, with the inductor L1, the input voltage Vin1 based on the control of the switch element SW1. Specifically, the step-down operation is performed in the following manner: the switch element SW1 is turned on, a current Iin1 based on the input voltage Vin1 flows into the inductor L1 and thus the inductor L1 produces a self-dielectric action for cancelling out the input voltage Vin1 input to the input terminal T1. The voltage stepped down in this way is smoothed by the capacitor C1 as described above and is output from the output terminal T2 as the voltage Vout1.

The diode D1 is connected to the node N1 between the source terminal S of the switch element SW1 and the inductor L1, and has a role in stably supplying, to the capacitor C1, a current which is energy stored in the inductor L1 and is discharged when the switch element SW1 is off. In this way, the output voltage Vout1 is stable even when the switch element SW1 is off. As the rectification element, instead of the diode D1, a switch element formed with, for example, an NMOS transistor turned on and off complementarily to the switch element SW1 is provided by being connected between the node N1 and the ground potential; a so-called step-down DC-DC converter of a synchronous system may be adopted which performs control by feeding, to the gate terminal of the switch element, a complementary signal to a signal supplied from the drive circuit 6 to the switch element SW1.

The integration circuit 2 includes a resistor element R1 serving as a first resistor element and a capacitor C2 serving as a first capacitor. In the resistor element R1, one end is connected to the node N1 on the side of the terminal L1a of the inductor L1. In the capacitor C2, one end is connected both to the terminal L1b of the inductor L1 and to the output terminal T2, and the other end is connected to the other end of the resistor element R1. In the integration circuit 2, the resistor element R1 and the capacitor C2 are connected in series to each other, and are connected in parallel to the inductor L1. The resistor element R1 has, for example, a resistance value of 100 kΩ, and the capacitor C2 has, for example, a capacitance value of 10 pF. Here, a connection point between the resistor element R1 and the capacitor C2 is referred to as a node N2 serving as a second node.

The integration circuit 2 integrates the switching voltage Vn1 supplied from the node N1 between the input terminal T1 and the inductor L1 to the resistor element R1 to generate a ripple voltage VS1a serving as a first ripple voltage. In this way, the potential of the node N2 becomes a ripple voltage VS1 including the ripple voltage VS1a. Since the ripple voltage VS1a is generated by integrating the switching voltage Vn1 which is changed from, for example, 0 to 12 V by the turning on and off of the switch element SW1, the ripple voltage VS1a includes a first ripple component based on this change characteristic.

The feedback voltage generation circuit 3 includes a resistor element R2 and a resistor element R3. In the resistor element R2, one end is connected to the output terminal T2. In the resistor element R3, one end is connected to the other end of the resistor element R2, and the other end is grounded. Here, the node of a connection point between the resistor element R2 and the resistor element R3 is referred to as a node N3 serving as a third node. The feedback voltage generation circuit 3 divides the output voltage Vout1 output from the output terminal T2 to generate a feedback voltage VK1. In this way, the potential of the node N3 becomes the feedback voltage VK1. Here, the node N3 and the node N2 are connected. Hence, the feedback voltage VK1 of the node N3 is an addition value of a voltage obtained by dividing the output voltage Vout1 with the resistor element R2 and the resistor element R3 and the ripple voltage VS1, and includes the first ripple component of the ripple voltage VS1a. The resistor element R2 has, for example, a resistance value of 10 kΩ, and the resistor element R3 has, for example, a resistance value of 5 kΩ. An unillustrated capacitor for cutting a direct-current component may be provided between the node N2 and the node N3 connected to each other.

The comparison circuit 4 includes a comparator 4a, a reference power supply 4b and a hysteresis circuit 4c. The comparator 4a includes an inverting terminal 4d serving as a first input terminal, a non-inverting terminal 4e serving as a second input terminal and an output terminal 4f serving as a first output terminal. The inverting terminal 4d is connected to the node N3 to receive the supply of the feedback voltage VK1 from the feedback voltage generation circuit 3. The non-inverting terminal 4e receives, from the reference power supply 4b, the supply of the reference voltage Vref1 determined by the hysteresis circuit 4c. The comparator 4a compares the feedback voltage VK1 input to the inverting terminal 4d and the reference voltage Vref1 input to the non-inverting terminal 4e, and outputs a comparison result signal VH1 as the comparison result. When the feedback voltage VK1 becomes higher than the reference voltage Vref1, the comparator 4a outputs, from the output terminal 4f, as the comparison result, for example, a low-level comparison result signal VH1 of 0 V with a delay corresponding to the operation time of itself whereas when the feedback voltage VK1 becomes lower than the reference voltage Vref1, the comparator 4a outputs, as the comparison result, for example, a high-level comparison result signal VH1 of 5 V with a delay corresponding to the operation time of itself.

The hysteresis circuit 4c includes a resistor element R4 and a resistor element R5. In the resistor element R4, one end is connected to the output terminal 4f of the comparator 4a, and the other end is connected to the non-inverting terminal 4e. In the resistor element R5, one end is connected to the other end of the resistor element R4 and the non-inverting terminal 4e, and the other end is connected to the reference power supply 4b. The hysteresis circuit 4c has a so-called hysteresis characteristic in which the reference voltage Vref1 determined by the resistance ratio between the resistor element R4 and the resistor element R5 is generated form the voltage supplied from the reference power supply 4b and is supplied to the non-inverting terminal 4e. However, in the present invention, the comparison circuit 4 does not need to include the hysteresis circuit 4c, and in this case, the reference power supply 4b may be connected to the non-inverting terminal 4e, and thus the reference voltage Vref1 may be directly supplied to the non-inverting terminal 4e. The resistance value of the resistor element R4 is, for example, 1 kΩ, and the resistance value of the resistor element R5 is, for example, 10Ω.

The integration circuit 5 includes a resistor element R6 serving as a second resistor element and the capacitor C2. In the resistor element R6, one end is connected to the output terminal 4f of the comparator 4a, and the other end is connected to the node N2. The integration circuit 5 forms an integration circuit together with the capacitor C2 of the integration circuit 2, integrates the comparison result signal VH1 output from the output terminal 4f and supplied to the resistor element R6 and supplies a ripple voltage VS1b serving as a second ripple voltage to the node N2. In this way, the ripple voltage VS1 serving as the potential of the node N2 is an addition value of the ripple voltage VS1a and the ripple voltage VS1b. Since the node N3 and the node N2 are connected, the feedback voltage VK1 of the node N3 is an addition value of the ripple voltage VS1a and the ripple voltage VS1 including the ripple voltage VS1b, and the feedback voltage VK1 is input to the inverting terminal 4d. The resistance value of the resistor element R6 is preferably lower than the resistance value of the resistor element R1 of the integration circuit 2, and has, for example, a resistance value of 10 kΩ.

Here, since the ripple voltage VS1b is generated by integrating the comparison result signal VH1 which is changed from, for example, 0 to 5 V by the change of the output of the comparator 4a, the ripple voltage VS1b includes a second ripple component based on this change characteristic. Hence, the ripple component of the ripple voltage VS1 is an addition value of the first ripple component of the ripple voltage VS1a and the second ripple component of the ripple voltage VS1b, and thus the first ripple component and the second ripple component are added to the feedback voltage VK1. The amplitude of a signal serving as the second ripple component of the ripple voltage VS1b is assumed to be less than the amplitude of a signal serving as the first ripple component of the ripple voltage VS1a.

Here, as described above, the capacitor C2 which is used by the integration circuit 5 and which is a constituent factor of the integration circuit is also used by the integration circuit 2. In this way, since it is not necessary to provide a dedicated capacitor for the integration circuit 5, when the integration circuit 5 is provided, it is possible to reduce an increase in the circuit area. Furthermore, the capacitor C2 also used by the integration circuit 5 is connected between the output terminal T2 and the node N2, and neither the terminal nor the node is grounded. Hence, since the integration circuit 5 is prevented from being disadvantageously affected by a high voltage or a high current handled by the voltage generation circuit 1 through the ground potential, it is possible to generate a highly accurate ripple voltage VS1b.

The drive circuit 6 is connected to the switch element SW1 and the comparison circuit 4. The drive circuit 6 receives the supply of the comparison result signal VH from the comparison circuit 4, and a control signal VD1 having a voltage level different depending on the voltage level of the comparison result signal VH1 is supplied to the gate terminal G of the switch element SW1. When the comparison result signal VH1 is high, the drive circuit 6 supplies, for example, the high-level control signal VD1 of 17 V to the gate terminal G of the switch element SW1 whereas when the comparison result signal VH1 is low, the drive circuit 6 supplies, for example, the low-level control signal VD1 of 0 V to the gate terminal G of the switch element SW1 to control the turning on and off of the switch element SW1. In this way, the switching voltage Vn1 is changed between, for example, 0 to 12 V. The drive circuit 6 is preferably operated according to the comparison result signal VH1, and is not limited to the configuration in which the comparison result signal VH1 is directly supplied from the comparison circuit 4.

(Operation of the Switching Power Supply Circuit 10)

Figure 2:
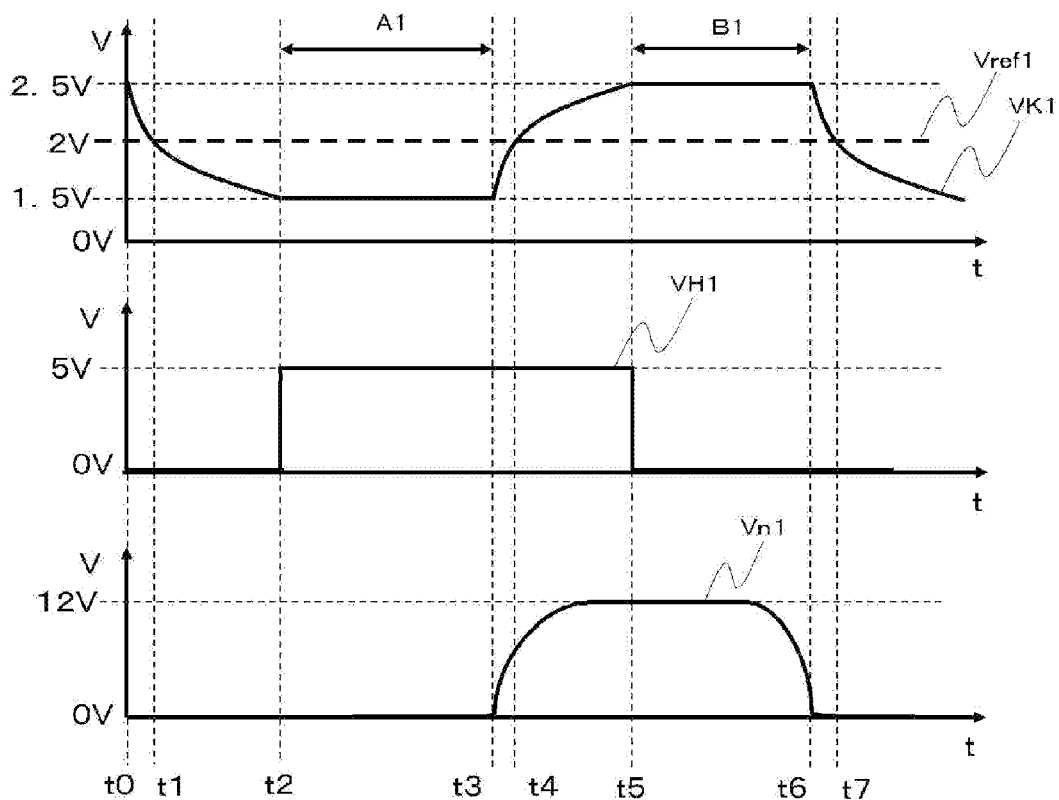
FIG. 2 A diagram showing the signal waveforms of the individual portions of the switching power supply circuit 10 as time changes.

FIG. 2 is a diagram showing the signal waveforms of the individual portions of the switching power supply circuit 10 shown in FIG. 1 as time changes. The upper stage of FIG. 2 is a diagram showing a relationship between the signal waveform of the feedback voltage VK and the reference voltage Vref1. The middle stage of FIG. 2 is a diagram showing the signal waveform of the comparison result signal VH1. The lower stage of FIG. 2 is a diagram showing the change of the voltage level of the switching voltage Vn1. In each of the stages of FIG. 2, the vertical axis represents the voltage level V, the horizontal axis represents the time t and times t0 to t7 represent common times to the stages of FIG. 2. Although in the present embodiment, the voltage level of the reference voltage Vref1 is varied by the hysteresis circuit 4c, for convenience of the drawing of the diagram, in the upper stage of FIG. 2, the reference voltage Vref1 is assumed to be constant, and variations thereof are not shown.

At the time t0, since, for example, the feedback voltage VK1 of 2.5 V input to the inverting terminal 4d is higher than, for example, the reference voltage Vref1 of 2 V, the comparison circuit 4 outputs the low-level comparison result signal VH1. Since the comparison result signal VH1 is low, the switch element SW1 controlled by the drive circuit 6 is off, and the switching voltage Vn1 is a potential which is lowered by a potential corresponding to a voltage drop of the diode D1 with respect to the ground voltage. Here, in the lower stage of FIG. 2, for convenience of the drawing of the diagram, when the switching voltage Vn1 is lower than 0 V, 0 V is shown.

When at the time t1, the feedback voltage VK1 input to the inverting terminal 4d becomes equal to or less than the reference voltage Vref1, at the time t2 which is delayed by the operation time of the comparison circuit 4, the high-level comparison result signal VH1 is output from the comparison circuit 4 and is supplied to the drive circuit 6. Here, since the drive circuit 6 is relatively low in operation speed, the timing at which the switch element SW1 is tuned on is delayed to the time t3. Hence, in the conventional switching power supply circuit, even after the comparison result signal VH1 is turned high, the potential of the feedback voltage VK1 based on the switching voltage Vn1 is continuously lowered.

However, in the present embodiment, since the node N1 and the node N2 are connected through the integration circuit 2, and moreover, the output terminal 4f of the comparator 4a in the comparison circuit 4 and the node N2 are connected through the integration circuit 5, after the time t2, the ripple voltage VS1b generated based on the high-level comparison result signal VH1 is added to the feedback voltage VK1 through the node N2. Hence, as shown in the upper stage of FIG. 2, in a period A1 from the time t2 to the time t3, that is, during a time in which after the comparison result signal VH1 is turned high, the switch element SW1 is turned on, the feedback voltage VK1 is maintained at, for example, 1.5 V, and thus it is possible to reduce a further decrease in the feedback voltage VK1. Although in the upper stage of FIG. 2, in the period A1, the potential of the feedback voltage VK1 is maintained, there is no limitation on this configuration, and the resistance value of the resistor element R6 is decreased, thus the effect of the second ripple component of the ripple voltage VS1b added to the feedback voltage VK1 is increased and during the period A1 in which after the comparison result signal is turned high, the switch element SW1 is turned on, the feedback voltage VK1 is increased, with the result that the feedback voltage VK1 may be brought closer to the voltage level of the reference voltage Vref1.

At the time t3, with a delay corresponding to the operation time of the drive circuit 6, the high-level control signal VD1 is supplied from the drive circuit 6 to the gate terminal G of the switch element SW1, and the switch element SW1 is turned on. In this way, the input voltage Vin1 is supplied from the power supply 7 through the switch element SW1 to the node N1, the switching voltage Vn1 is increased and the output voltage Vout1 is increased accordingly. As the output voltage Vout1 is increased, the feedback voltage VK1 is increased. Here, since the feedback voltage VK1 includes the ripple component obtained by adding the ripple voltage VS1b to the ripple voltage VS1a, as compared with a case where only the ripple component of either of the ripple voltage VS1a and the ripple voltage VS1b is supplied to the node N3, the potential per unit time can be more increased. Furthermore, in the present embodiment, in the period A1 after the time t2, the second ripple component of the ripple voltage VS1b based on the high-level comparison result signal VH1 is supplied to the node N2, and thus a further decrease in the potential of the feedback voltage VK1 is reduced, with the result that it is possible to more rapidly increase the feedback voltage VK1 to a high potential.

When at the time t4, the feedback voltage VK1 input to the inverting terminal 4d exceeds the reference voltage Vref1, at the time t5 which is delayed by the operation time of the comparison circuit 4, the low-level comparison result signal VH1 is output and is supplied to the drive circuit 6. Here, since the drive circuit 6 is relatively low in operation speed, the timing at which the switch element SW1 is tuned on is delayed. Hence, in the conventional switching power supply circuit, even after the comparison result signal VH1 is turned low, the potential of the feedback voltage VK1 based on the switching voltage Vn1 is continuously increased.

However, in the present embodiment, since the node N1 and the node N2 are connected through the integration circuit 2, and moreover, the output terminal 4f of the comparator 4a in the comparison circuit 4 and the node N2 are connected through the integration circuit 5, after the time t5, the ripple voltage VS1b generated based on the low-level comparison result signal VH1 is added to the feedback voltage VK1 through the node N2. Hence, as shown in the upper stage of FIG. 2, in a period B1 from the time t5 to the time t6, that is, during a time in which after the comparison result signal VH1 is turned low, the switch element SW1 is turned off, the feedback voltage VK1 is maintained at, for example, 2.5 V, and thus it is possible to reduce a further increase in the feedback voltage VK1. Although in the upper stage of FIG. 2, in the period B1, the potential of the feedback voltage VK1 is maintained, there is no limitation on this configuration, and the resistance value of the resistor element R6 is more decreased, thus the effect of the second ripple component of the ripple voltage VS1b added to the feedback voltage VK1 is increased and during the period B1 in which after the comparison result signal is turned low, the switch element SW1 is turned off, the feedback voltage VK1 is lowered, with the result that the feedback voltage VK1 may be brought closer to the voltage level of the reference voltage Vref1.

At the time t6, with a delay corresponding to the operation time of the drive circuit 6, the low-level control signal VD1 is supplied to the gate terminal G of the switch element SW1, and the switch element SW1 is turned off. In this way, the supply of the input voltage Vin1 from the power supply 7 to the node N1 is stopped, the switching voltage Vn1 starts to be lowered and the output voltage Vout1 and hence the feedback voltage VK1 starts to be lowered accordingly. Here, since the ripple voltage VS1a including the first ripple component and the ripple voltage VS1b including the second ripple component are added, as compared with a case where only the second ripple component of either of the ripple voltage VS1a and the ripple voltage VS1b is supplied to the node N3, the potential per unit time can be more lowered. Furthermore, in the period B1 after the time t5, the second ripple component of the ripple voltage VS1b based on the low-level comparison result signal VH1 is supplied to the node N2, and thus a further increase in the potential of the feedback voltage VK1 is reduced, with the result that it is possible to more rapidly decrease the feedback voltage VK1 to a low potential.

In the present embodiment, as described above, since the feedback voltage VK1 includes the first ripple component of the ripple voltage VS1a obtained by integrating the switching voltage Vn1, as compared with a case where the feedback voltage VK1 includes only the second ripple component of the ripple voltage VS1b, an increase and a decrease in the potential per unit time, and hence the amplitude of the feedback voltage VK1 can be more increased. Hence, even when some noise enters the inverting terminal 4d, as compared with a case where the feedback voltage VK1 includes only the ripple voltage VS1b, it is possible to reduce a possibility that the switching power supply circuit 10 is erroneously operated. In the present embodiment, since the feedback voltage VK1 includes the first ripple component of the ripple voltage VS1a obtained by integrating the switching voltage Vn1, even when as seen in a RF power amplifier or a CPU, a drive voltage or a drive current which the load 8 needs is significantly varied, it is possible to rapidly follow the drive voltage or the drive current after being varied.

As described above, the resistor element R6 of the integration circuit 5 is preferably lower in resistance value than the resistor element R1 of the integration circuit 2. This is because when the resistance value of the resistor element R6 is lower, it is possible to more provide the effect of the voltage level of the comparison result signal VH1 to the feedback voltage VK1.

(Effects of the Embodiment)

In the switching power supply circuit 10 according to the embodiment of the present invention, since the integration circuit 2 that integrates the switching voltage Vn1 to generate the ripple voltage VS1a including the first ripple component and the integration circuit 5 that integrates the comparison result signal VH1 to generate the ripple voltage VS1b including the second ripple component are included, and the ripple voltage VS1a and the ripple voltage VS1b are added to the feedback voltage VK1 and are input to the inverting terminal 4d, the first ripple component and the second ripple component are provided to the feedback voltage VK1 to increase variations in the potential per unit time, and thus it is possible to reduce the effect of noise, it is possible to reduce a decrease in the potential of the feedback voltage VK1 after the comparison result signal VH1 is turned high and it is possible to reduce an increase in the potential of the feedback voltage VK1 after the comparison result signal VH1 is turned low. In this way, it is possible to supply the more stable output voltage Vout1 to the load 8.

[Variation]

Figure 3:
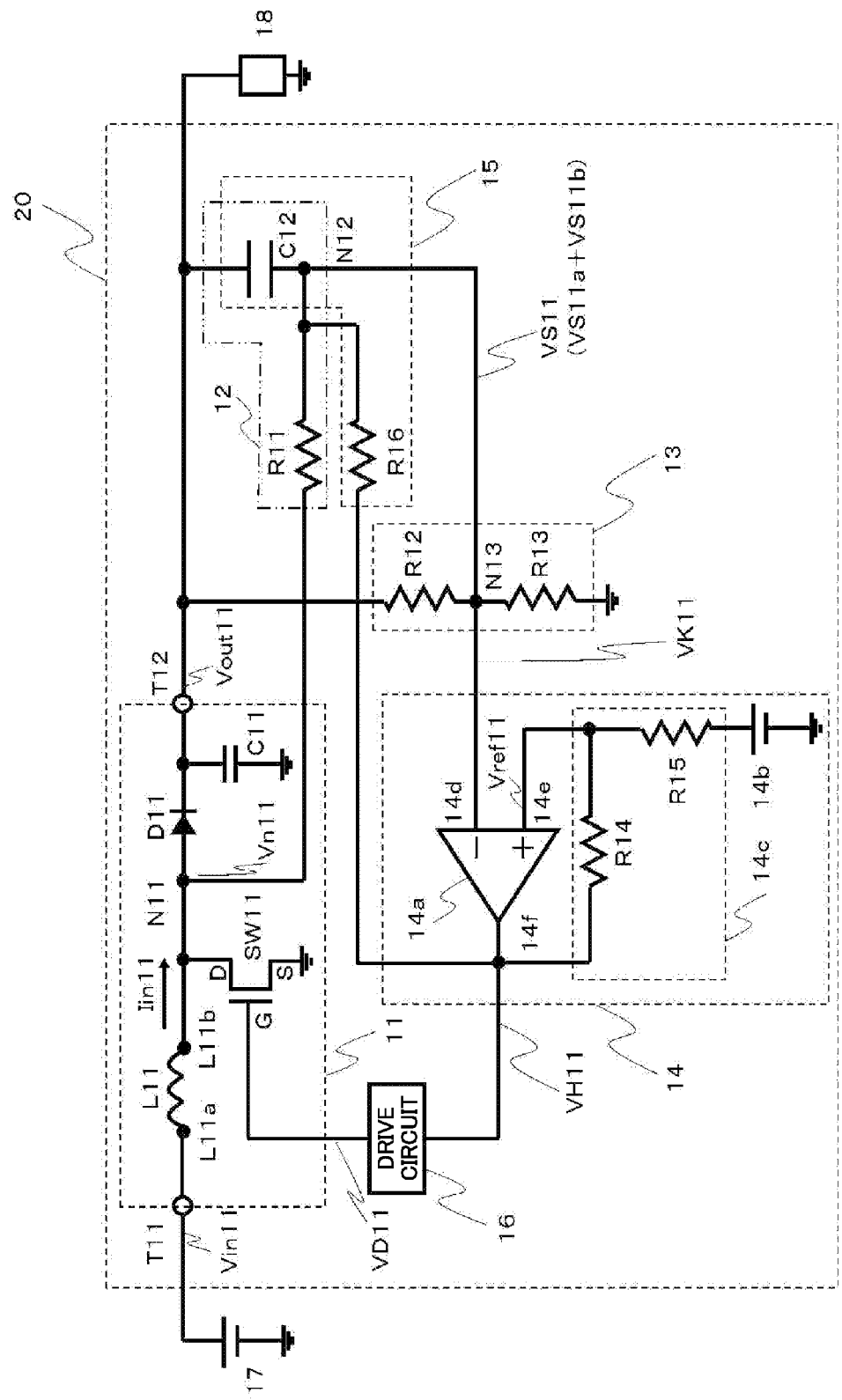
FIG. 3 A diagram schematically showing a switching power supply circuit 20 according to a variation of the embodiment of the present invention.
Figure 4:
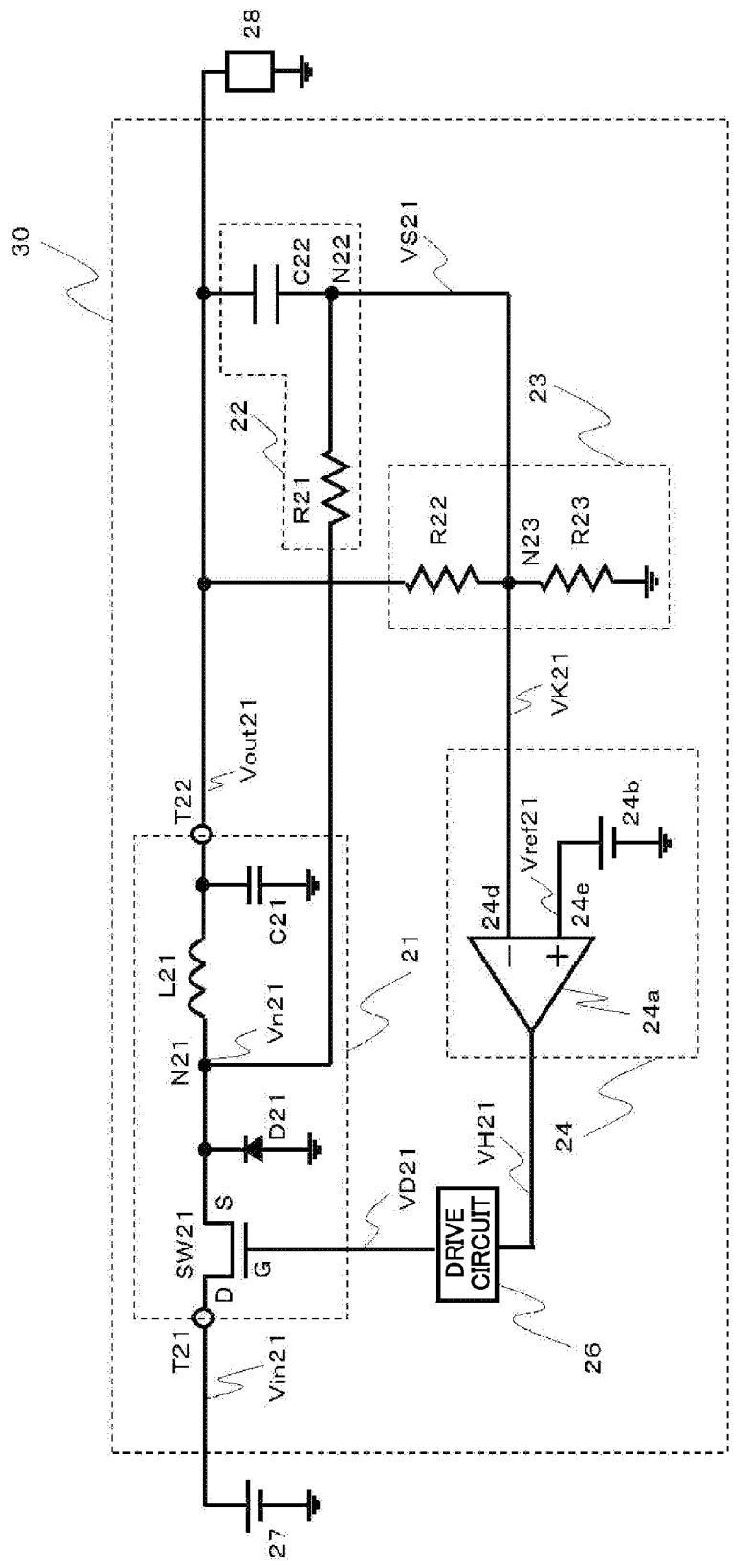
FIG. 4 A diagram schematically showing a conventional switching power supply circuit 30.
Figure 5:
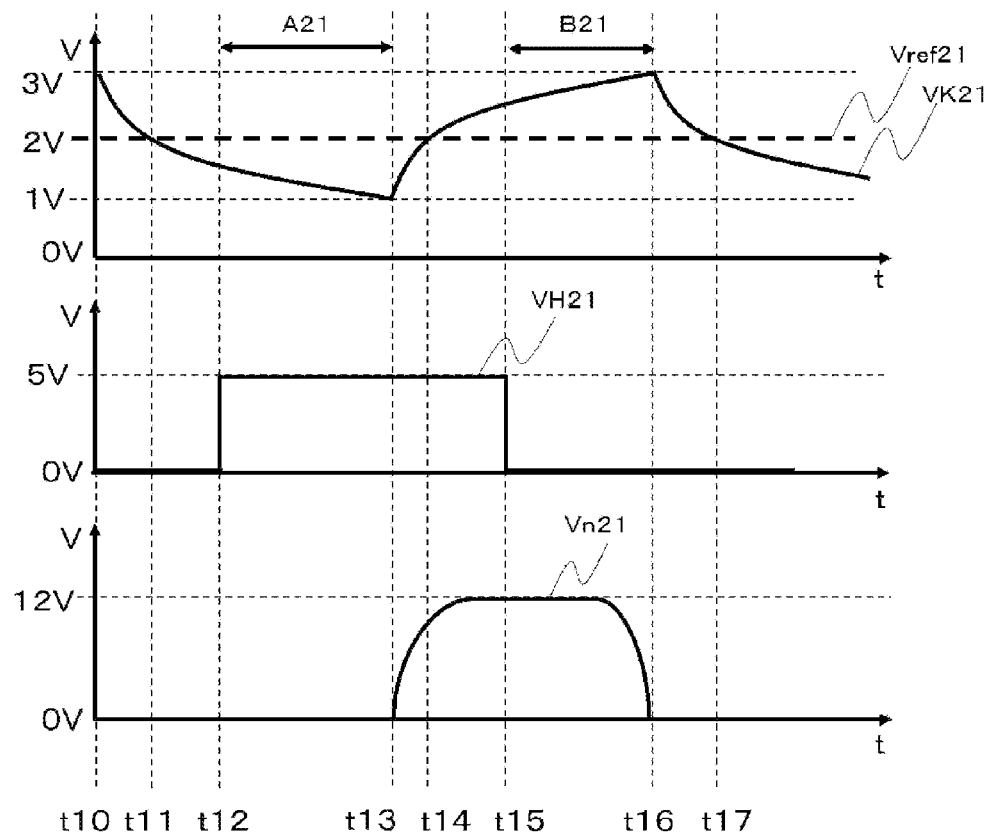
FIG. 5 A diagram showing the signal waveforms of the individual portions of the switching power supply circuit 30 as time changes.
Figure 6:
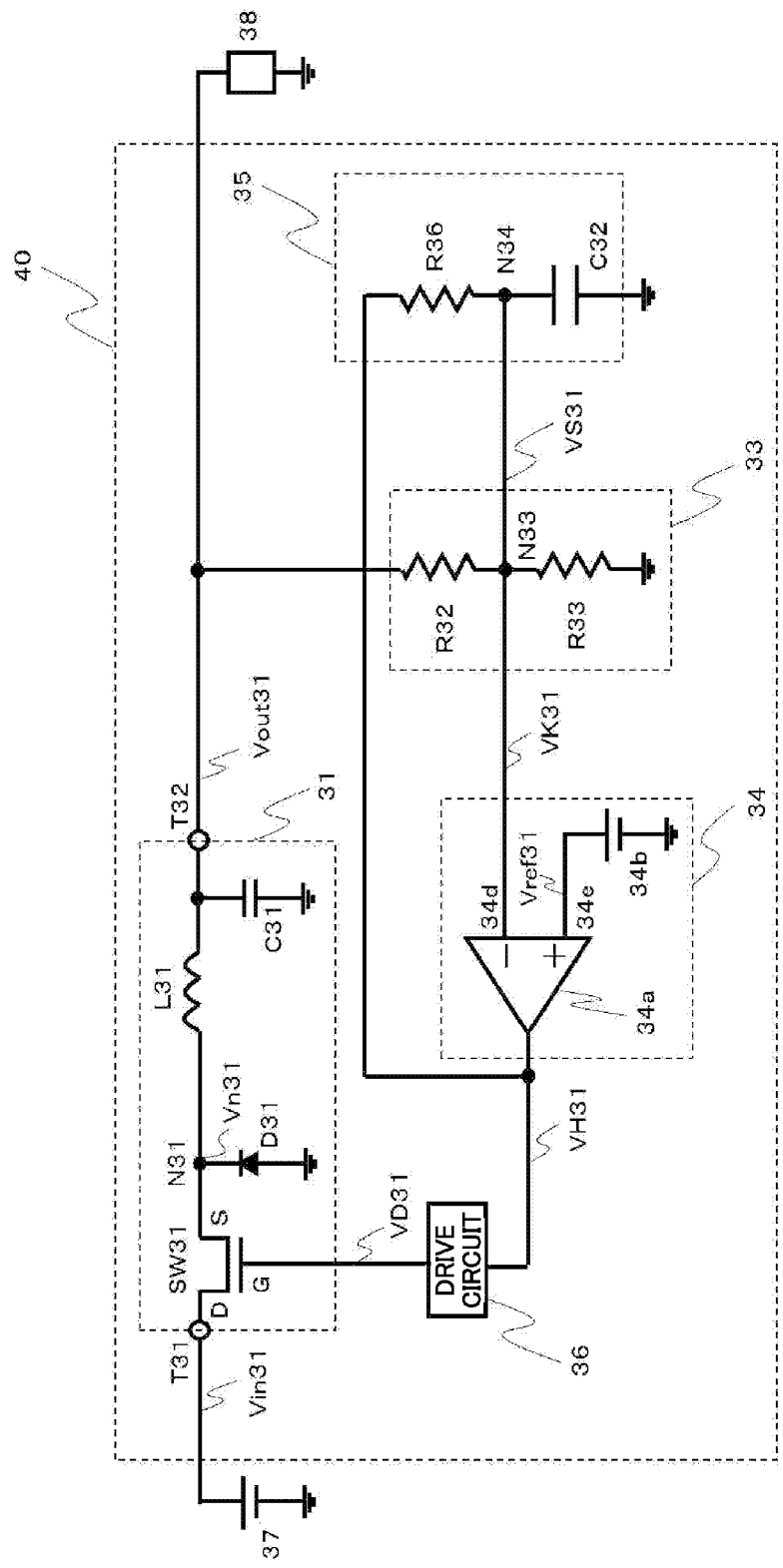
FIG. 6 A diagram schematically showing a conventional switching power supply circuit 40.
Figure 7:
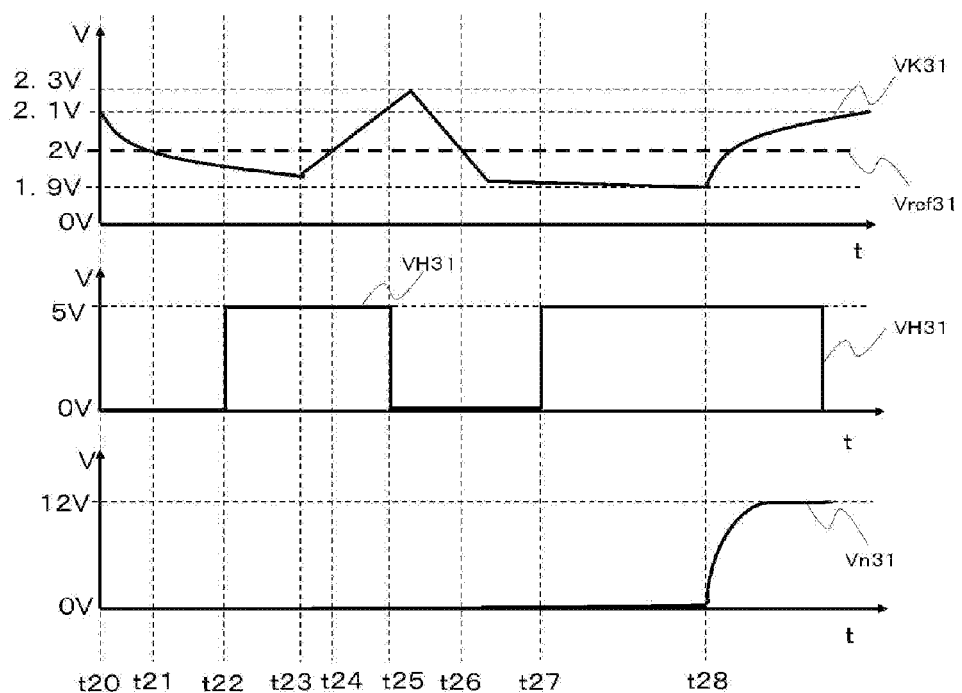
FIG. 7 A diagram showing the signal waveforms of the individual portions of the switching power supply circuit 40 as time changes.

FIG. 3 is a diagram schematically showing a switching power supply circuit 20 according to a variation of the embodiment of the present invention. The switching power supply circuit 20 is a step-up DC-DC converter of an asynchronous system. The switching power supply circuit 20 includes a voltage generation circuit 11, an integration circuit 12 serving as a first integration circuit, a feedback voltage generation circuit 13, a comparison circuit 14, an integration circuit 15 serving as a second integration circuit and a drive circuit 1. The voltage generation circuit 11 is significantly different from the voltage generation circuit 1 described in the embodiment of the present invention. A power supply 17 and a load 18 are connected to the switching power supply circuit 20.

The voltage generation circuit 11 includes an input terminal T11, a switch element SW11, an inductor L11, a capacitor C11, an output terminal T12 and a diode D11 serving as a rectification element.

The input terminal T11 is connected to, for example, the power supply 17 of 12 V, and the power supply voltage of the power supply 17 is supplied as an input voltage Vin11. The inductor L11 includes a terminal L11a serving as a third terminal and a terminal L11b serving as a fourth terminal, and the terminal L11a is connected to the input terminal T11. In the switch element SW11, a drain terminal which is one end is connected to the inductor L11b, and a source terminal D which is the other end is connected to a ground potential. The switch element SW11 controls the magnitude of a current flowing from the input terminal T11 into the inductor L11.

In the diode D11, an anode is connected to the terminal L11b of the inductor L11 and the drain terminal D of the switch element SW11. Here, the node of a connection point between the anode of the diode D11 and the terminal L11b of the inductor L11 is referred to as a node N11 serving as a fourth node, and the voltage of the node N11 is referred to as a switching voltage Vn11.

In the capacitor C11, one end is connected in series to the cathode of the diode D11, and the other end is grounded, and the switch element SW11 is turned on and off to smooth a voltage generated in the inductor L11. The output terminal T2 is connected to a connection point between the cathode of the diode D11 and one end of the capacitor C11, and outputs, as an output voltage Vout11, the voltage smoothed by the capacitor C11.

The voltage generation circuit 11 has the configuration described above and has a function as a step-up DC-DC converter that steps up, for example, the input voltage Vin11 of 12 V input from the input terminal T11 to generate, for example, the output voltage Vout1 of 20 V and that outputs it from the output terminal T12. Here, the step-up operation by the voltage generation circuit 11 is performed by converting, with the inductor L11, the input voltage Vin11 based on the control of the switch element SW11. Specifically, the step-up operation is performed in the following manner: the switch element SW11 is first turned on, a current Iin corresponding to the input voltage Vin11 is passed through the inductor L11, magnetic energy is stored in the inductor L11, thereafter the switch element SW11 is turned off to discharge the magnetic energy of the inductor L11 and a high voltage is generated. As described above, the voltage stepped up in this way is smoothed in the capacitor C11 and is output as the output voltage Vout11 from the output terminal T12. The diode D11 has a role in stably supplying the energy generated in the inductor L11 to the output terminal T12 when the switch element SW11 is off.

The integration circuit 12 includes a resistor element R11 serving as a third resistor element and a capacitor C12 serving as a second capacitor. In the resistor element R11, one end is connected to the node N11 on the side of the terminal L11a of the inductor L11. In the capacitor C12, one end is connected to the cathode of the diode D11 and the output terminal T12, and the other end is connected to the other end of the resistor element R11. In the integration circuit 12, the resistor element R11 and the capacitor C12 are connected to each other, and are connected in parallel to the inductor L11. The resistor element R11 has, for example, a resistance value of 100 kΩ, and the capacitor C12 has, for example, a capacitance value of 10 pF. Here, a connection point between the resistor element R11 and the capacitor C12 is referred to as a node N12 serving as a fifth node.

The integration circuit 12 integrates the switching voltage Vn11 supplied from the node N11 between the inductor L11 and the diode D11 to the resistor element R11 to generate a ripple voltage VS11a serving as a first ripple voltage. In this way, the potential of the node N12 becomes a ripple voltage VS11 including the ripple voltage VS11a. Since the ripple voltage VS11a is generated by integrating the switching voltage Vn11 which is changed from, for example, 0 to 12 V by the turning on and off of the switch element SW11, the ripple voltage VS11a includes a first ripple component based on this change characteristic.

Here, when in the step-up DC-DC converter, a underlying voltage for generating the ripple voltage VS11a is derived from, for example, the input voltage Vin11 which is the potential of the input terminal T11 of the connection point between the terminal L11a of the inductor L11 and the power supply 17, as compared with a case where the underlying voltage for generating the ripple voltage VS11a is the switching voltage Vn11 of the node N11, it is impossible to obtain a sufficient ripple component. This is because between the power supply 17 and the terminal L11a of the inductor L11, a capacitor is preferably connected as a stabilizing capacitance, and thus the capacitor significantly limits the change of the switching voltage Vn11 obtained by the turning on and off of the switch element SW11. Hence, the underlying voltage for generating the ripple voltage VS11a is preferably the switching voltage Vn11 of the node N11.

The feedback voltage generation circuit 13 includes a resistor element R12 and a resistor element R13. In the resistor element R12, one end is connected to the output terminal T12. In the resistor element R13, one end is connected to the other end of the resistor element R12, and the other end is grounded. Here, the node of a connection point between the resistor element R12 and the resistor element R13 is referred to as a node N13 serving as a sixth node. The feedback voltage generation circuit 13 divides the output voltage Vout11 output from the output terminal T12 to generate a feedback voltage VK11. In this way, the potential of the node N13 becomes the feedback voltage VK11. Here, the node N13 and the node N12 are connected. Hence, the feedback voltage VK11 of the node N13 is an addition value of a voltage obtained by dividing the output voltage Vout11 with the resistor element R12 and the resistor element R13 and the ripple voltage VS11, and includes the first ripple component of the ripple voltage VS11a. The resistor element R12 has, for example, a resistance value of 10 kΩ, and the resistor element R13 has, for example, a resistance value of 5 kΩ. An unillustrated capacitor for cutting a direct-current component may be provided between the node N12 and the node N13 connected to each other.

The comparison circuit 14 includes a comparator 14a, a reference power supply 14b and a hysteresis circuit 14c. The comparator 14a includes an inverting terminal 14d serving as a first input terminal, a non-inverting terminal 14e serving as a second input terminal and an output terminal 14f serving as a second output terminal. The inverting terminal 14d is connected to the node N13 to receive the supply of the feedback voltage VK11 from the feedback voltage generation circuit 13. The non-inverting terminal 14e receives, from the reference power supply 14b, the supply of the reference voltage Vref11 determined by the hysteresis circuit 14c. The comparator 14a compares the feedback voltage VK11 input to the inverting terminal 14d and the reference voltage Vref11 input to the non-inverting terminal 14e, and when the feedback voltage VK11 becomes higher than the reference voltage Vref11, the comparator 14a outputs, from the output terminal 14f, as the comparison result, for example, a low-level comparison result signal VH11 of 0 V with a delay corresponding to the operation time of itself whereas when the feedback voltage VK11 becomes lower than the reference voltage Vref11, the comparator 14a outputs, as the comparison result, for example, a high-level comparison result signal VH11 of 5 V with a delay corresponding to the operation time of itself.

The hysteresis circuit 14c includes a resistor element R14 and a resistor element R15. In the resistor element R14, one end is connected to the output terminal 14f of the comparator 14a, and the other end is connected to the non-inverting terminal 14e. In the resistor element R15, one end is connected to the other end of the resistor element R14 and the non-inverting terminal 14e, and the other end is connected to the reference power supply 14b. The hysteresis circuit 14c has a so-called hysteresis characteristic in which the reference voltage Vref11 determined by the resistance ratio between the resistor element R14 and the resistor element R15 is generated form the voltage supplied from the reference power supply 14b and is supplied to the non-inverting terminal 14e. However, in the present invention, the comparison circuit 14 does not need to include the hysteresis circuit 14c, and in this case, the reference power supply 14b may be connected to the non-inverting terminal 14e, and thus the reference voltage Vref11 may be directly supplied to the non-inverting terminal 14e. The resistance value of the resistor element R14 is, for example, 1 kΩ, and the resistance value of the resistor element R15 is, for example, 10Ω.

The integration circuit 15 includes a resistor element R16 serving as a fourth resistor element and the capacitor C12. In the resistor element R16, one end is connected to the output terminal 14f of the comparator 14a, and the other end is connected to the node N12. The integration circuit 15 forms an integration circuit together with the capacitor C12 of the integration circuit 12, integrates the comparison result signal VH output from the output terminal 14f and supplied to the resistor element R16 and supplies a ripple voltage VS11b serving as a second ripple voltage to the node N12. In this way, the ripple voltage VS11 serving as the potential of the node N12 is an addition value of the ripple voltage VS11a and the ripple voltage VS11b. Since the node N13 and the node N12 are connected, the feedback voltage VK11 of the node N13 is an addition value of the ripple voltage VS11a and the ripple voltage VS11 including the ripple voltage VS11b, and the feedback voltage VK11 is input to the inverting terminal 14d. The resistor element R16 has, for example, a resistance value of 100 kΩ.

Here, since the ripple voltage VS11b is generated by integrating the comparison result signal VH11 which is changed from, for example, 0 to 5 V by the change of the output of the comparator 14a, the ripple voltage VS11b includes a second ripple component based on this change characteristic. Hence, the ripple component of the ripple voltage VS11 is an addition value of the first ripple component of the ripple voltage VS11a and the second ripple component of the ripple voltage VS11b, and thus the first ripple component and the second ripple component are added to the feedback voltage VK11. The amplitude of a signal serving as the second ripple component of the ripple voltage VS11b is assumed to be less than the amplitude of a signal serving as the first ripple component of the ripple voltage VS11a.

Here, as described above, the capacitor C12 which is used by the integration circuit 15 and which is a constituent factor of the integration circuit is also used by the integration circuit 12. In this way, since it is not necessary to provide a dedicated capacitor for the integration circuit 15, when the integration circuit 15 is provided, it is possible to reduce an increase in the circuit area. Furthermore, the capacitor C12 also used by the integration circuit 15 is connected between the output terminal T12 and the node N12, and neither the terminal nor the node is grounded. Hence, since the integration circuit 15 is prevented from being disadvantageously affected by a high voltage or a high current handled by the voltage generation circuit 1 through the ground potential, it is possible to generate a highly accurate ripple voltage VS11b.

The drive circuit 16 is connected to the switch element SW11 and the comparison circuit 14. The drive circuit 16 receives the supply of the comparison result signal VH11 from the comparison circuit 14, and a control signal VD11 having a voltage level different depending on the voltage level of the comparison result signal VH11 is supplied to the gate terminal G of the switch element SW11. When the comparison result signal VH11 is high, the drive circuit 16 supplies, for example, the high-level control signal VD11 of 30 V to the gate terminal G of the switch element SW11 whereas when the comparison result signal VH11 is low, the drive circuit 16 supplies, for example, the low-level control signal VD11 of 0 V to the gate terminal G of the switch element SW11 to control the turning on and off of the switch element SW11. In this way, the switching voltage Vn11 is changed between, for example, 0 to 12 V. The drive circuit 16 is preferably operated according to the comparison result signal VH11, and is not limited to a configuration in which the comparison result signal VH11 is directly supplied from the comparison circuit 14.

(Effects of the Variation of the Embodiment)

In the switching power supply circuit 20 according to the variation of the embodiment of the present invention, as in the embodiment of the present invention, since the integration circuit 12 that integrates the switching voltage Vn11 to generate the ripple voltage VS11a including the first ripple component and the integration circuit 15 that integrates the comparison result signal VH11 including a second change component output from the output terminal 14f of the comparator 14a to generate the ripple voltage VS1b including the second ripple component based on the second change component are included, and the ripple voltage VS11a and the ripple voltage VS11b are added to the feedback voltage VK11 and are input to the inverting terminal 14d, the first ripple component is provided to the feedback voltage VK11 to increase variations in the potential per unit time, and thus it is possible to reduce the effect of noise, it is possible to reduce a decrease in the potential of the feedback voltage VK11 after the comparison result signal VH11 is turned high and it is possible to reduce an increase in the potential of the feedback voltage VK11 after the comparison result signal VH11 is turned low. In this way, it is possible to supply the more stable output voltage Vout11 to the load 18.

Figure 8:
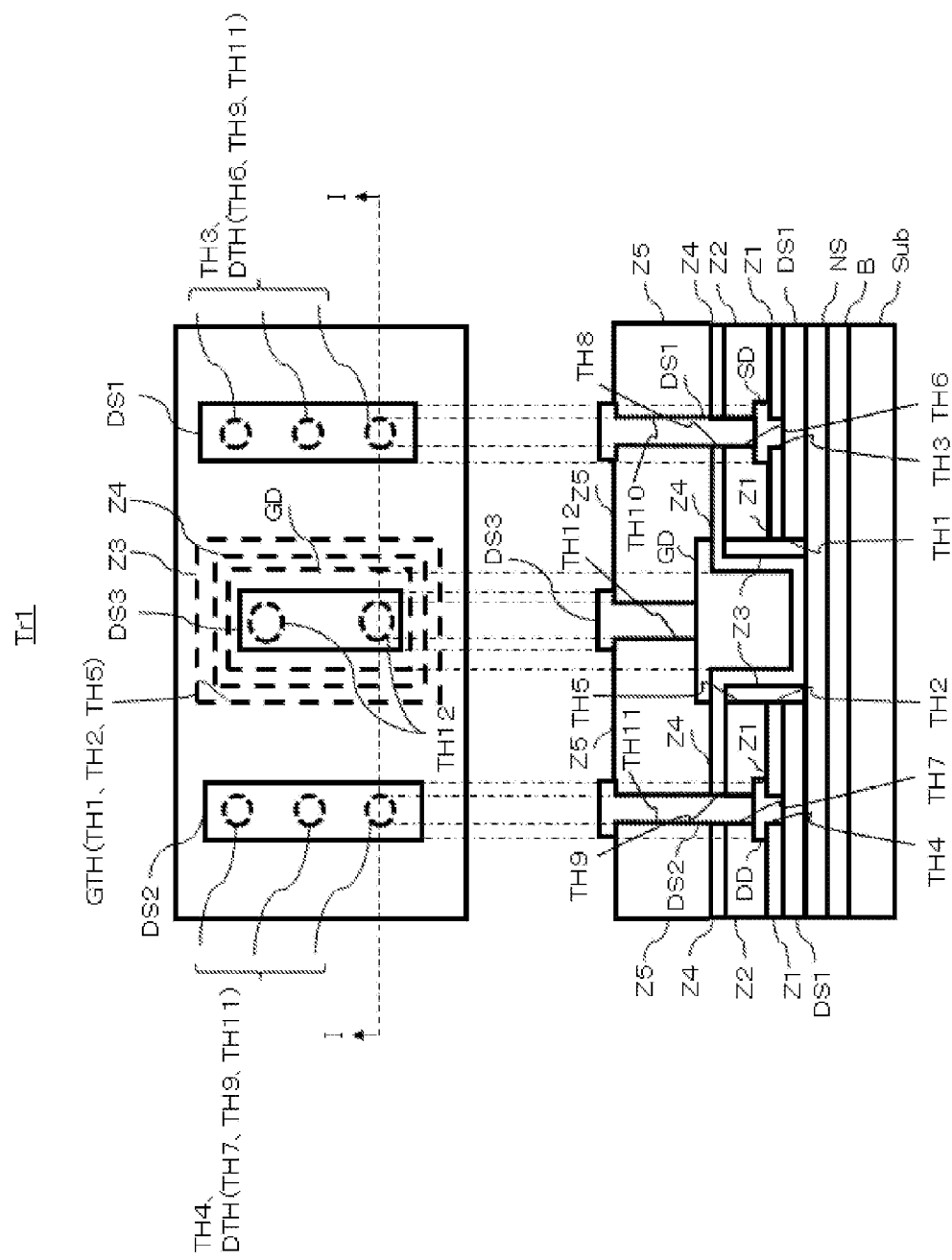
FIG. 8 A diagram schematically showing a transistor Tr1 that is one of switch elements which can be applied to switch elements SW1, SW11, SW21 and SW31 included in the switching power supply circuit 10 according to the embodiment of the present invention.

FIG. 8 is a diagram schematically showing a transistor Tr1 that is one of switch elements which can be applied to the switch elements SW1, SW11, SW21 and SW31 included in the switching power supply circuit 10 according to the embodiment of the present invention. The transistor Tr1 is a transistor that utilizes the properties of GaN, and is a normally-off type transistor in which when it is not used, its operation is off in a natural state and an electrical connection between the source element and the drain element is reduced.

(Configuration of Transistor Tr1)

The upper stage of FIG. 8 is a plan view of the transistor Tr1, and the lower stage of FIG. 8 is a cross-sectional view taken along oblique line I-I in the upper stage of FIG. 8. Although the periphery of the transistor Tr1 is rectangular in plan view, there is no limitation on this configuration. Although in FIG. 8, for convenience, one transistor Tr1 is shown, the switch element SW1, SW11, SW21 or SW31 may be formed with a plurality of transistors Tr1 connected in parallel to or in series to each other.

Although a supporting substrate Sub is a silicon substrate such as a semiconductor substrate, there is no limitation on this configuration, and silicon carbide (SiC), sapphire or the like can be applied.

Although a buffer layer B is formed on the supporting substrate Sub, and is formed of aluminum nitride (AlN), which is the main material, there is no limitation on this configuration, and aluminum nitride (AlN) and aluminum gallium nitride (AlGaN) can be sequentially deposited in layers from the side of the supporting substrate Sub.

A nitride semiconductor layer NS is formed on the buffer layer B, and is formed of gallium nitride (GaN), which is the main material.

Although an electron supply layer DS1 is formed on the nitride semiconductor layer NS, and is formed of aluminum nitride (AlN), which is the main material, there is no limitation on this configuration, and it can be formed of aluminum gallium nitride (AlGaN). In part of the electron supply layer DS1, the nitride semiconductor layer NS is exposed through an opening TH1. Although the opening TH1 is rectangular in plan view, there is no limitation on this configuration.

Although an insulating layer Z1 is formed on the electron supply layer DS1, and is formed with, for example, a silicon oxide film ($SiO_2$), there is no limitation on this configuration, and it may be formed with a silicon nitride film or a double layer structure in which a silicon oxide film and a silicon nitride film are sequentially deposited in layers from the side of the supporting substrate Sub. Part of the insulating layer Z1 is opened, and is referred to as an opening TH2. In the insulating layer Z1, the nitride semiconductor layer NS is exposed both through the opening TH1 and the opening TH2. The opening TH2 coincides with the opening TH1 in plan view. Although the opening TH2 is rectangular in plan view, there is no limitation on this configuration as long as the opening TH2 coincides with the opening TH1 in plan view.

In part of the insulating layer Z1, the electron supply layer DS1 is also exposed through a plurality of openings other than the opening TH1. Here, the opening arranged on the right side through the opening TH1 in the upper stage of FIG. 8 is referred to as an opening TH3, and the opening arranged on the left side is referred to as an opening TH4. Although the opening TH3 and the opening TH4 are circular in plan view, and a plurality thereof are provided, there is no limitation on this configuration.

A source electrode SD is formed of, for example, aluminum (Al), and is formed so as to extend from the upper surface of the insulating layer Z1 through the interior of the opening TH3 to the electron supply layer DS1. Although in the lower stage of FIG. 8, the source electrode SD is shown as one member that is continuous from the surface of the insulating layer Z1 through the opening TH3 to the electron supply layer DS1, there is no limitation on this configuration, and the source electrode SD may be formed with different members in the opening TH3 and on the surface of the insulating layer Z1. The source electrode SD is not limited to the configuration described above, and may have a configuration in which titanium (Ti) and aluminum (Al) are sequentially deposited in layers from the side of the supporting substrate Sub or may have a multilayer structure of Ti/AlSiCu/Ti/TiN.

A drain electrode DD is formed of, for example, aluminum (Al), and is formed so as to extend from the upper surface of the insulating layer Z1 through the interior of the opening TH4 to the electron supply layer DS1. Although in the lower stage of FIG. 8, the drain electrode DD is shown as one member that is continuous from the surface of the insulating layer Z1 through the opening TH4 to the electron supply layer DS1, there is no limitation on this configuration, and the drain electrode DD may be formed with different members in the opening TH4 and on the surface of the insulating layer Z1.

An insulating layer Z2 is formed on the insulating layer Z1, the source electrode SD and the drain electrode DD so as to cover them. Although the insulating layer Z2 is formed with, for example, a silicon oxide film ($SiO_2$), there is no limitation on this configuration. Part of the insulating layer Z2 is opened, and it is referred to as an opening TH3. In the insulating layer Z2, the nitride semiconductor layer NS is exposed both through the opening TH1 and the opening TH2 and an opening TH5. The opening TH5 coincides with the opening TH1 and the opening TH2 in plan view. Although the opening TH5 is rectangular in plan view, there is no limitation on this configuration as long as the opening TH5 coincides with the opening TH1 and the opening TH2 in plan view.

In part of the insulating layer Z2, part of the source electrode SD and part of the drain electrode DD are exposed through a plurality of openings other than the opening TH5. Here, the opening arranged on the right side through the opening TH5 in the upper stage of FIG. 8 is referred to as an opening TH6, and the opening arranged on the left side is referred to as an opening TH7.

An insulating layer Z3 is formed on the nitride semiconductor layer NS so as to expose part of the nitride semiconductor layer NS and make contact with the nitride semiconductor layer NS and to extend to straddle an area from the nitride semiconductor layer NS through the opening TH1 and the opening TH2 to the opening TH5. The insulating layer Z3 is formed so as to make intimate contact with the side surfaces of the electron supply layer DS1, the insulating layer Z1 and the insulating layer Z2. The insulating layer Z3 is rectangular in plan view, and is formed so as to expose the surface of the nitride semiconductor layer NS therewithin. Although the insulating layer Z3 is formed with, for example, a silicon oxide film ($SiO_2$), there is no limitation on this configuration.

An insulating layer Z4 is formed so as to extend from the upper surface of the insulating layer Z2 via the upper surface of the insulating layer Z3 through the opening TH1, the opening TH2 and the opening TH5 to the upper surface of the nitride semiconductor layer NS. Although the insulating layer Z4 is formed with, for example, a silicon oxide film ($SiO_2$), there is no limitation on this configuration, and it may be formed with a $HfO_2$ film, an AlON film, a HfSiO film, a SiN film or a SiON film.

Here, the opening TH1, the opening TH2 and the opening TH5 are collectively referred to as a gate opening GTH. The part of the insulating layer Z4 formed to make intimate contact with the nitride semiconductor layer NS is referred to as the "bottom surface" of the gate opening, and the part of the insulating layer Z4 formed to make intimate contact with the insulating layer Z3 is referred to as the "side wall" of the gate opening.

The insulating layer Z4 includes: an opening TH8 that coincides with the opening TH6 in plan view and that exposes the source electrode SD together with the opening TH6; and an opening TH9 that coincides with the opening TH7 in plan view and that exposes the drain electrode DD together with the opening TH7. Although in the upper stage of FIG. 8, the opening TH6 is shown to be circular, its shape is not limited to such a circular shape as long as the opening TH6 coincides with the opening TH8 in plan view. Although in the upper stage of FIG. 8, the opening TH9 is shown to be circular, its shape is not limited to such a circular shape as long as the opening TH9 coincides with the opening TH7 in plan view.

A gate electrode GD is formed so as to extend from the upper surface of the insulating layer Z4 through a gate opening GTD to the bottom surface of the gate opening GTH. Although the gate electrode GD is formed of, for example, molybdenum (Mo), there is no limitation on this configuration, tungsten or the like can be applied and a multilayer structure of Ti/TiN/W may be adopted. The gate electrode GD is formed so as to make intimate contact with the bottom surface and the side wall of the gate opening GTH.

An insulating layer Z5 is formed so as to cover the insulating layer Z4 and the gate electrode GD. Although the insulating layer Z5 is formed with, for example, a silicon oxide film ($SiO_2$), there is no limitation on this configuration. The insulating layer Z5 includes: an opening TH10 that coincides with the opening TH6 and the opening TH8 in plan view and that exposes the source electrode SD together with the opening TH6 and the opening TH8; and an opening TH11 that coincides with the opening TH7 and the opening TH9 and that exposes the drain electrode DD together with the opening TH7 and the opening TH9. Although in the upper stage of FIG. 8, the opening TH10 is shown to be circular, its shape is not limited to such a circular shape as long as the opening TH10 coincides with the sixth and eighth openings in plan view. Although in the upper stage of FIG. 11, the opening TH11 is shown to be circular, its shape is not limited to such a circular shape as long as the opening TH11 coincides with the seventh and ninth openings in plan view.

The insulating layer Z5 exposes, in plan view, the gate electrode GD with a plurality of openings other than the openings TH10 and TH11. Here, the plurality of openings are collectively referred to as an opening TH12.

Here, the openings TH6, TH8 and TH10 are collectively referred to as an opening STH. The openings TH7, TH9 and TH11 are collectively referred to as an opening DTH.

A conductive layer DS1 is connected from the upper surface of the insulating layer Z5 through the opening STH to the source electrode SD. Although the conductive layer DS1 is formed of, for example, aluminum (Al), there is no limitation on this configuration, and the conductive layer DS1 may have a multilayer structure of Ti/TiN/AlSiCu/Ti/TiN from the side of the supporting substrate Sub. Although in the lower stage of FIG. 8, the conductive layer DS1 is shown as one member that is continuous from the surface of the insulating layer Z5 through the opening STH to the source electrode SD, there is no limitation on this configuration, and the conductive layer DS1 may be formed with different members in the opening STH and on the surface of the insulating layer Z5.

A conductive layer DS2 is connected from the upper surface of the insulating layer Z5 through the opening DTH to the drain electrode DD. Although the conductive layer DS2 is formed of, for example, aluminum (Al), there is no limitation on this configuration, and the conductive layer DS2 may have a multilayer structure of Ti/TiN/AlSiCu/Ti/TiN from the side of the supporting substrate Sub. Although in the lower stage of FIG. 8, the conductive layer DS2 is shown as one member that is continuous from the surface of the insulating layer Z5 through the opening DTH to the drain electrode DD, there is no limitation on this configuration, and the conductive layer DS2 may be formed with different members in the opening DTH and on the surface of the insulating layer Z5.

A conductive layer DS3 is connected from the upper surface of the insulating layer Z5 through the opening TH12 to the gate electrode GD. Although the conductive layer DS3 is formed of, for example, aluminum (Al), there is no limitation on this configuration, and the conductive layer DS3 may have a multilayer structure of Ti/TiN/AlSiCu/Ti/TiN from the side of the supporting substrate Sub. Although in the lower stage of FIG. 8, the conductive layer DS3 is shown as one member that is continuous from the surface of the insulating layer Z5 through the opening TH12 to the gate electrode GD, there is no limitation on this configuration, and the conductive layer DS3 may be formed with different members in the opening TH12 and on the surface of the insulating layer Z5.

A transistor Tr has the following configuration. The source electrode of the transistor Tr corresponds to the source terminal S of each of the switch elements SW1, SW11, SW21 and SW31 included in the switching power supply circuit 10 according to the embodiment of the present invention, and the drain electrode DD of the transistor Tr corresponds to the drain terminal D of each of the switch elements SW1, SW11, SW21 and SW31 included in the switching power supply circuit 10 according to the embodiment of the present invention.

(Operation of the Transistor Tr)

The transistor Tr can be applied to the switch elements SW1, SW11, SW21 and SW31 included in the switching power supply circuit 10 according to the embodiment of the present invention. The transistor Tr is brought into an on-state when a potential difference equal to or more than a predetermined threshold value is produced between the gate electrode GD and the source electrode SD whereas the transistor Tr is brought into an off-state when the potential difference is equal to or less than the predetermined threshold value.

Here, in the transistor Tr, on the surface of the nitride semiconductor layer NS facing the conductive layer DS1, electrons are constantly produced and trapped by the electric polarization of the conductive layer DS1 and the nitride semiconductor layer NS. In the transistor Tr, when no voltage is applied to the gate electrode GD and the source electrode SD, since on the surface of the nitride semiconductor layer NS facing the insulating layer Z3, the insulating layer Z3 does not have electric polarization, a state where electrons are naturally produced is not achieved, with the result that the source electrode SD and the drain electrode DD are electrically insulated. The transistor Tr described above is generally referred to as a normally-off type GaN transistor.

When as described above, the transistor Tr having the properties of GaN is applied to the switch element SW1, SW11, SW21 or SW31 included in the switching power supply circuit 10 according to the embodiment of the present invention, as compared with a general NMOS transistor or PMOS transistor, the switching speed can be increased, and thus it is possible to highly accurately adjust the voltage Vout1, Vout11, Vout 21 or Vout31 adjusted by the switch element SW1, SW11, SW21 or SW31, with the result that it is possible to more stably operate the load 18.

Although in FIG. 8, as the transistor Tr having the properties of GaN, a normally-off type transistor is shown, as the transistor which has the properties of GaN and which can be applied to the switch element SW1, SW11, SW21 or SW31 included in the switching power supply circuit 10 according to the embodiment of the present invention, there is also a normally-on type in which the source electrode and the drain electrode are electrically connected in a natural state. Hence, the transistor Tr is not limited to the normally-off type transistor.

INDUSTRIAL APPLICABILITY

In the switching power supply circuit of the present invention, since an output voltage generated by stepping down or stepping up an input voltage supplied from a power supply can be supplied more stably, the industrial applicability thereof is high.

(Other Variations)

Although in the above discussion, the preferred embodiments of the present invention are described, it is obvious to the person skilled in the art that variations can be achieved by various methods on the disclosed invention, and that various embodiments other than the specific configurations described above are possible. Hence, the following claims are intended to include the technical scope of any variation of the present invention without departing from the spirit and the technical view of the present invention.

What is claimed is:

1. A switching power supply circuit that generates an output voltage from an input voltage supplied from a power supply, the switching power supply circuit comprising:
   a voltage generation circuit that generates the output voltage from the input voltage by smoothing, with a capacitor, a voltage produced in an inductor based on turning on and off of a switch element;
   a first integration circuit that integrates a switching voltage produced by the turning on and off of the switch element to generate a first ripple voltage including a first ripple component;
   a feedback voltage generation circuit that divides the output voltage to generate a feedback voltage;

a comparison circuit that compares the feedback voltage input to a first input terminal with a reference voltage input to a second input terminal to output a result of the comparison as a comparison result signal;

a second integration circuit that integrates the comparison result signal to generate a second ripple voltage including a second ripple component; and a drive circuit that controls the turning on and off of the switch element based on the comparison result signal, wherein the first ripple component and the second ripple component are added to the feedback voltage input to the first input terminal.

2. The switching power supply circuit according to claim 1, wherein the first integration circuit is formed with a first resistor element to which the switching voltage is supplied and a first capacitor, and the second integration circuit is formed with a second resistor element to which the comparison result signal is supplied and the first capacitor.

3. The switching power supply circuit according to claim 2, wherein a resistance value of the second resistor element is less than a resistance value of the first resistor element.

4. The switching power supply circuit according to claim 1, wherein the voltage generation circuit includes an input terminal which receives the supply of the input voltage from the power supply, one end of the switch element is connected to the input terminal, the inductor includes a first terminal and a second terminal, the first terminal is connected to the other end of the switch terminal and the second terminal is connected to the output terminal, one end of the capacitor is connected to the second terminal of the inductor, and the other end is connected to a ground potential, the first integration circuit includes a first resistor element and a first capacitor, one end of the first resistor element is connected to a first node of a connection point between the first terminal of the inductor and the switch element and one end of the first capacitor is connected to the second terminal of the inductor and the other end is connected to the other end of the first resistor element such that the first integration circuit is connected in parallel to the inductor and the voltage generation circuit steps down the input voltage to generate the output voltage.

5. The switching power supply circuit according to claim 4, wherein the second integration circuit includes a second resistor element in which one end is connected to an output terminal of the comparison circuit and in which the other end is connected to a second node of a connection point between the first resistor element and the first capacitor.

6. The switching power supply circuit according to claim 5, wherein a resistance value of the second resistor element is less than a resistance value of the first resistor element.

7. The switching power supply circuit according to claim 1, wherein the voltage generation circuit includes an input terminal which receives the supply of the input voltage from the power supply, the inductor includes a first terminal and a fourth second terminal, and the first terminal is connected in series to the input terminal, one end of the switch element is connected to the second terminal, the capacitor is connected to a side of the second terminal of the inductor, the first integration circuit includes a first resistor element and a first capacitor, one end of the first resistor element is connected to a node between the second terminal of the inductor and a rectification element and one end of the first capacitor is connected to the output terminal and the other end is connected to the other end of the first resistor element such that the first integration circuit is connected in parallel to the inductor, and the voltage generation circuit steps up the input voltage to generate the output voltage.

8. The switching power supply circuit according to claim 7, wherein the second integration circuit includes a second resistor element in which one end is connected to an output terminal of the comparison circuit and in which the other end is connected to a node between the second resistor element and the first capacitor.

9. The switching power supply circuit according to claim 8, wherein a resistance value of the second resistor element is less than a resistance value of the first resistor element.

10. The switching power supply circuit according to claim 1, wherein when the output of the comparison result signal is changed, the feedback voltage is changed so as to be brought closer to a voltage level of the reference voltage over a predetermined period.

11. The switching power supply circuit according to claim 1, wherein when the feedback voltage becomes higher than the reference voltage, the comparison circuit outputs the low-level comparison result signal whereas when the feedback voltage becomes lower than the reference voltage, the comparison circuit outputs the high-level comparison result signal, when the switch element is turned on, the feedback voltage starts to be increased whereas when the feedback voltage becomes higher than the reference voltage and the comparison result signal is turned low, the feedback voltage starts to be lowered and when the switch element is turned off, the feedback voltage starts to be lowered whereas when the feedback voltage becomes lower than the reference voltage and the comparison result signal is turned high, the feedback voltage starts to be increased.

* * * * *